United States Patent
Cantrell et al.

(10) Patent No.: US 11,079,242 B2
(45) Date of Patent: Aug. 3, 2021

(54) SYSTEM AND METHOD FOR DETERMINING AUTONOMOUS VEHICLE LOCATION USING INCREMENTAL IMAGE ANALYSIS

(71) Applicant: Walmart Apollo, LLC, Bentonville, AR (US)

(72) Inventors: Robert L. Cantrell, Herndon, VA (US); David C. Winkle, Bella Vista, AR (US); John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 209 days.

(21) Appl. No.: 16/226,353

(22) Filed: Dec. 19, 2018

(65) Prior Publication Data

US 2019/0204093 A1 Jul. 4, 2019

Related U.S. Application Data

(60) Provisional application No. 62/611,773, filed on Dec. 29, 2017.

(51) Int. Cl.
| | |
|---|---|
| *G01C 21/32* | (2006.01) |
| *G06T 7/73* | (2017.01) |
| *G05D 1/00* | (2006.01) |
| *B64C 39/02* | (2006.01) |
| *G06F 16/29* | (2019.01) |

(Continued)

(52) U.S. Cl.
CPC ............ *G01C 21/32* (2013.01); *B64C 39/024* (2013.01); *G05D 1/0088* (2013.01); *G06F 16/29* (2019.01); *G06F 16/583* (2019.01); *G06F 16/9537* (2019.01); *G06T 7/74* (2017.01); *B64C 2201/141* (2013.01); *G06T 2207/30244* (2013.01); *G06T 2207/30252* (2013.01)

(58) Field of Classification Search
CPC ..... G06T 7/74; G01C 21/32; G06F 16/29; B64C 39/024; G05D 1/0088
USPC ........................................................ 701/446
See application file for complete search history.

(56) References Cited

U.S. PATENT DOCUMENTS 5,961,571 A * 10/1999 Gorr ....................... G01S 3/783
340/988
7,606,416 B2 * 10/2009 Han ..................... G05D 1/0246
382/162

(Continued)

FOREIGN PATENT DOCUMENTS

| WO | 2016131005 A1 | 8/2016 |
| WO | 2017037697 A1 | 3/2017 |

*Primary Examiner* — Yazan A Soofi
(74) *Attorney, Agent, or Firm* — Duane Morris LLP; Manita Rawat

(57) ABSTRACT

Systems, methods, and computer-readable storage media for determining autonomous vehicle location using incremental image analysis. An exemplary method can include identifying an expected position of an autonomous vehicle which is moving, and identifying, an actual position of the autonomous vehicle. The identifying of the actual position occurs by obtaining images of the autonomous vehicle's surroundings, initiating an iterative image comparison of those images to previously stored images within a given geographic radius of the autonomous vehicle, and iteratively extending the radius (and the pictures being compared) until a match is found or until the maximum radius is reached.

20 Claims, 5 Drawing Sheets

(51) Int. Cl.
*G06F 16/9537* (2019.01)
*G06F 16/583* (2019.01)

(56) References Cited

U.S. PATENT DOCUMENTS

| | | | | |
|---|---|---|---|---|
| 8,301,374 | B2* | 10/2012 | Surampudi | G01C 21/30 |
| | | | | 701/438 |
| 8,855,442 | B2* | 10/2014 | Owechko | G06T 7/344 |
| | | | | 382/294 |
| 8,913,783 | B2* | 12/2014 | Khan | G06K 9/00651 |
| | | | | 382/103 |
| 9,689,686 | B1* | 6/2017 | Carmack | H04K 3/90 |
| 2008/0027591 | A1* | 1/2008 | Lenser | G05D 1/0251 |
| | | | | 701/2 |
| 2010/0004802 | A1* | 1/2010 | Bodin | G05D 1/0038 |
| | | | | 701/11 |
| 2013/0027555 | A1* | 1/2013 | Meadow | 348/144 |
| 2017/0160401 | A1* | 6/2017 | Lei | G01S 19/51 |
| 2017/0215168 | A1* | 7/2017 | Dong | H04B 17/27 |
| 2018/0141562 | A1* | 5/2018 | Singhal | B60W 30/0956 |
| 2018/0259976 | A1* | 9/2018 | Williams | G01C 21/32 |

* cited by examiner

SYSTEM AND METHOD FOR DETERMINING AUTONOMOUS VEHICLE LOCATION USING INCREMENTAL IMAGE ANALYSIS

PRIORITY

The present application claims priority to U.S. Provisional Patent Application No. 62/611,773, filed Dec. 29, 2017, the contents of which are incorporated herein in their entirety.

BACKGROUND

1. Technical Field

The present disclosure relates to determining the location of an autonomous vehicle, and more specifically to using an incremental image analysis to determine the location of the autonomous vehicle.

2. Introduction

The Global Positioning System (GPS) has changed the way location systems work. Whereas in the past people relied on maps, dead reckoning, triangulation, or even asking someone where they were to discover their location, now people can simply discover their location based on where a GPS device says they are located. Once rare, GPS devices are now commonly available in cars and in smartphones, and can be easily coupled with maps or mapping software to identify a user's location. In many configurations, GPS location services are augmented with cellular or Wi-Fi signals, allowing an even faster capacity to identify the user's location.

Autonomous vehicles, such as drones, factory robots, and unmanned cars or trucks, often use cellular, Wi-Fi, and GPS systems to identify a current location. However, despite the widespread availability of such systems, there are circumstances where the transmitting and receiving of electromagnetic signals necessary in cellular, Wi-Fi, and GPS systems, becomes impeded or otherwise unavailable. For example, in a significant forest, there is unlikely to be Wi-Fi, there may be few if any cellular towers, and the forest canopy may interfere with the ability to receive GPS signals from orbiting satellites. Similar difficulties can exist in buildings, tunnels, or other locations where location signals cannot reach. Likewise, for autonomous vehicles which rely on a single type of location services (e.g., reliant solely on GPS), if that single type of location service breaks or is otherwise impaired, the autonomous vehicle may be unable to continue successfully navigating.

Technical Problem

How to minimize the image processing required to do image-based location determination for an autonomous vehicle.

SUMMARY

An exemplary method for performing the concepts disclosed herein can include: identifying, at a central location and via a processor accessing a memory device, an expected position of an autonomous vehicle which is moving; and identifying, via the processor, an actual position of the autonomous vehicle, by: transmitting, from the processor at the central location to the autonomous vehicle, a request for on-board location information, the on-board location information comprising: surrounding images comprising surroundings of the autonomous vehicle; and peer GPS (Global Positioning System) data for proximate peers; receiving, at the central location from the autonomous vehicle and in response to the request, the on-board location information; determining, based on the peer GPS data in the on-board location information, that the actual position of the autonomous vehicle is outside a threshold range of the expected position, to yield a determination; initiating, based on the determination, an iterative image comparison, wherein each iteration of the iterative image comparison: extends a geographic radius extending from the expected position; and compares stored images within the geographic radius to the surrounding images, until the comparison of the stored images to the surrounding images within a given geographic radius yields the actual position with a predetermined certainty.

An exemplary system as disclosed herein can include: a processor; and a computer-readable storage medium having instructions stored which, when executed by the processor, cause the processor to perform operations comprising: identifying, at a central location, an expected position of an autonomous vehicle which is moving; and identifying an actual position of the autonomous vehicle, by: transmitting, from the central location to the autonomous vehicle, a request for on-board location information, the on-board location information comprising: surrounding images comprising surroundings of the autonomous vehicle; and peer GPS (Global Positioning System) data for proximate peers; receiving, at the central location from the autonomous vehicle and in response to the request, the on-board location information; determining, based on the peer GPS data in the on-board location information, that the actual position of the autonomous vehicle is outside a threshold range of the expected position, to yield a determination; initiating, based on the determination, an iterative image comparison, wherein each iteration of the iterative image comparison: extends a geographic radius extending from the expected position; and compares stored images within the geographic radius to the surrounding images, until the comparison of the stored images to the surrounding images within a given geographic radius yields the actual position with a predetermined certainty.

An exemplary non-transitory computer-readable storage medium as disclosed herein can have instructions stored which, when executed by a computing device, cause the computing device to perform operations which include: identifying, at a central location, an expected position of an autonomous vehicle which is moving; and identifying an actual position of the autonomous vehicle, by: transmitting, at the central location to the autonomous vehicle, a request for on-board location information, the on-board location information comprising: surrounding images comprising surroundings of the autonomous vehicle; and peer GPS (Global Positioning System) data for proximate peers; receiving, at the central location from the autonomous vehicle and in response to the request, the on-board location information; determining, based on the peer GPS data in the on-board location information, that the actual position of the autonomous vehicle is outside a threshold range of the expected position, to yield a determination; initiating, based on the determination, an iterative image comparison, wherein each iteration of the iterative image comparison: extends a geographic radius extending from the expected position; and compares stored images within the geographic radius to the surrounding images, until the comparison of the stored images to the surrounding images within a given geographic radius yields the actual position with a predetermined certainty.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
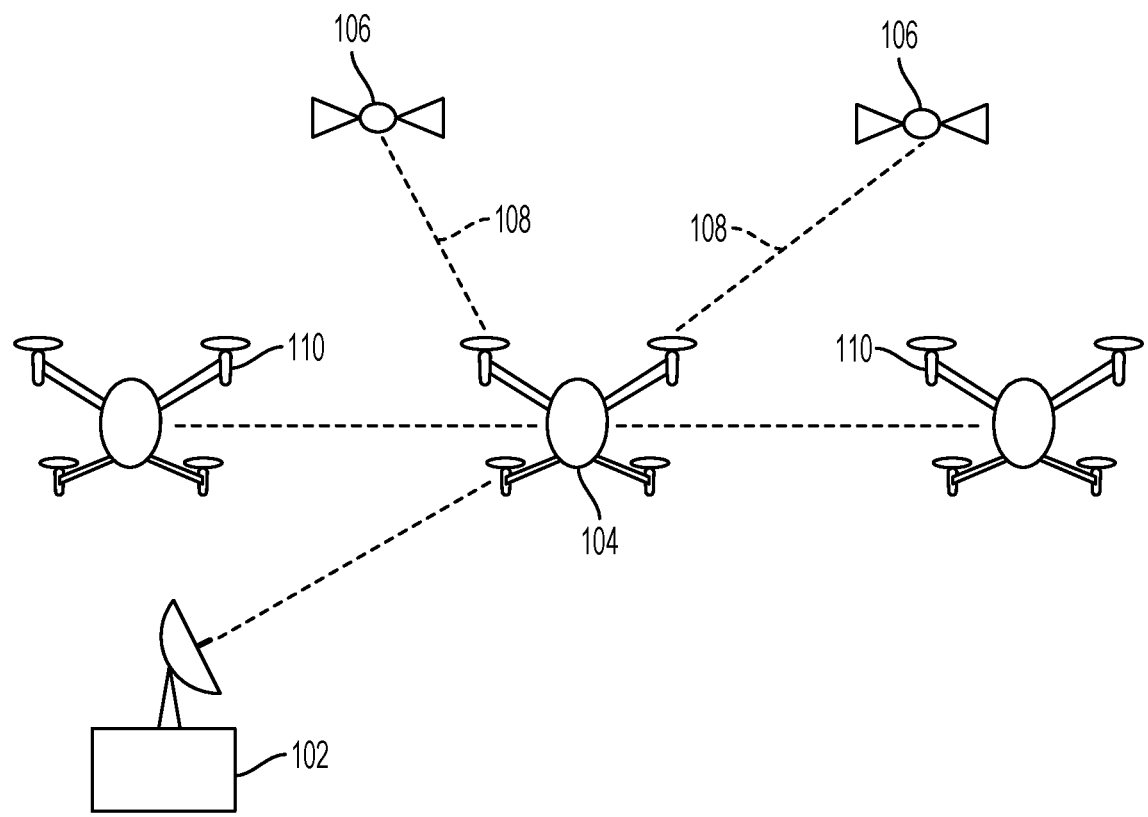
FIG. 1 illustrates an example of an autonomous vehicle communicating with a variety of resources.

Various embodiments of the disclosure are described in detail below. While specific implementations are described, it should be understood that this is done for illustration purposes only. Other components and configurations may be used without parting from the spirit and scope of the disclosure.

When the primary location service used by an autonomous vehicle to identify its current location is disabled or otherwise not available, the autonomous vehicle can switch to a backup system or go into a protective/shutdown mode. However, one disadvantage of the protective/shutdown mode is that whatever mission the autonomous vehicle was attempting to complete will no longer be completed.

The concepts and principles disclosed herein can be used to implement a backup location system for autonomous vehicles. When the primary location system (such as a GPS system) is unavailable, backup systems configured as disclosed herein can provide location services by using an incremental, iterative, image comparison process. In such a system, sensors aboard the autonomous vehicle record pictures of the area around and/or below the autonomous vehicle. These pictures are then compared to other pictures taken previously, where the previous pictures have known location coordinates and photographic angles. The system compares the pictures looking for a match, where the stored photographs are compared to newly taken "current" photographs based on the stored photographs having a known location near the expected/predicted location of the autonomous vehicle. If no match is found, the system iteratively expands the radius for comparison photographs until either a match is found or the maximum radius is reached.

The image comparison process used to identify the current location of the autonomous vehicle can occur either on the autonomous vehicle itself, or can occur at a central server or processor communicating with the autonomous vehicle. Consider the following examples.

In a first exemplary configuration, a drone can be flying towards a destination and lose its GPS location system. The drone can, using sensors on the outside of the drone, take photographs of the drone's surroundings. These current photographs of the drone's surroundings are then compared, by a processor onboard the drone, to images stored in memory aboard the drone. The images stored on the drone may be selected based on the drone's expected flight path. First, the drone processor begins by selecting photographs of objects located near the expected location of the drone (i.e., within a certain radius of the expected location). If none of these stored photographs correspond to the photographs of the current surroundings, the processor expands the radius, selects additional photographs within that expanded radius, and again compares the images. This iterative process continues until the processor identifies the location of the autonomous vehicle, or until the maximum radius is reached and the processor initiates procedures to place the drone in a lockdown configuration. Iteratively and incrementally expanding the geographic boundaries used for picture selection in this way results in faster identification of the drone's location, because only those photographs which are predicted to be useful in identifying the location are used (rather than all photographs stored in the database).

In a second exemplary configuration, the drone can again be flying towards a destination and lose its GPS location system. However, in this case the drone continues to maintain communications with a central controller or processor. In this case, the drone can again, using sensors on the outside of the drone, take photographs of the drone's surroundings. These photographs are then transmitted to the central controller, which compares the current photographs of the drone's surroundings to images stored in memory at the central controller. The processor of the central controller begins by selecting photographs of objects located near the expected location of the drone (i.e., within a certain radius of the expected location). If none of these stored photographs correspond to the photographs of the current surroundings, the processor expands the radius, selects additional photographs within that expanded radius, and again compares the images. This iterative process continues until the central controller identifies the location of the drone, at which point the central controller can give instructions to the drone based on the identified location, or until the maximum radius is reached and the central controller initiates procedures to place the drone in a lockdown configuration.

The image comparison process can take into account angles, partial pictures, shading, colors, weather, etc. For example, a picture taken of the autonomous vehicle's surroundings may be taken from a slightly different height, angle, or perspective than the stored photograph or data to which it is being compared, or may only contain a portion of the objects contained in the stored photograph. To accomplish this, the image comparison process can, in one configuration, build a wireframe or model of the landscape (within the expected location radius) based on the images and data stored in the database, then compare the image of the surroundings to objects within the model. If no match is found, the radius can expand, and the model or wireframe can likewise expand.

In some configurations, rather than building a model or wireframe, the system can rely on flight simulator data for the location, where the flight simulator data is already modeled and stored in the autonomous vehicle memory or in the central controller memory. As the autonomous vehicle takes pictures of the surroundings, the pictures are compared to perspectives within the pre-constructed flight simulator model. This comparison again begins within an expected radius, then iteratively expands the radius of comparison within the simulator model.

In accounting for weather, coloring, shading, lighting, etc., the system can, in one configuration, strip color from the comparison (i.e., only rely on a grey-scale, or black and white version of the respective photographs). Upon identifying a potential match, the system can then add the original colors back in and determine if the colors are within a threshold level of similarity. In some cases, the system may choose to disregard color if other factors outweigh the color factor. For example, if a building appears in both the saved photograph and the current surroundings photograph, but the color of the building has changed, the system may (in some circumstances) assume that the building has been painted or otherwise changed colors. Exemplary circumstances where such an assumption may be made include where other objects within the photographs have a high level of certainty/similarity, where the time of day (sunrise or sunset, night versus day, etc.) or weather (humidity, cloud cover, etc.) would likely result in color or shading alteration, known distinctions based on the cameras used for the current photographs and those used for the previous photographs, etc.

Likewise, the photographs and images captured can be ultraviolet or infrared. That is, the images can capture frequencies outside the normal ranges of human vision. Such images can capture, for example, heat signatures, ultra-violet beacons, or other non-visible information, which can also be compared to previously captured images. As needed, infrared and/or ultraviolet images can be combined with normal, "human-visible" images, as part of the image comparison process.

In some configurations, the iterative image analysis process described herein can be used with other secondary location systems. For example, if there are other autonomous vehicles nearby, the location data of those other vehicles can be combined with the imaging information to provide location coordinates for the vehicle with the disabled location system. Driverless cars, for example, may be operating in an environment with other driverless cars. In some configurations, the driverless vehicles can communicate with one another using short range RF signaling, Bluetooth, etc. When such a vehicle loses its primary location system, but retains its short range communication system, the other vehicles can provide their location coordinates to the location-system-disabled vehicle. The exact location of the location-system-disabled vehicle can then be determined using imagery, camera angles, and the locations of the other vehicles.

Other secondary location systems which can be used (alone, or preferably with the iterative image processing and comparison disclosed herein) include triangulation systems which rely on communication link strength with cellular towers or vehicles; identifying (Internet Protocol) location based in part on the IP addresses of a Wi-Fi connection; on-board compass information; satellite, drone, aircraft, or other airborne imagery of the vehicle; a distance or vector to a listening station; radar; and/or sonar.

Some exemplary, non-limiting benefits of the disclosed system include: (1) a back-up location system for when a primary location system is disabled or inoperative, and (2) a faster computer system for identifying the location based on imagery. Having described some exemplary configurations and benefits, the disclosure now turns to the illustrated figures.

FIG. 1 illustrates an example of an autonomous vehicle (in this case a drone) 104 communicating with a variety of resources. Other exemplary autonomous vehicles which can be used herein include drones, robots, driverless cars, etc. Some of the resources communicating with the drone 104 can include GPS satellites 106, which constantly broadcast 108 signals which are used by GPS systems to identify a current location. Additional resources communicating with the drone 104 can include other drones 110, other autonomous vehicles, or ground stations 102. Ground stations 102 refer to fixed terrestrial reference points (i.e., having a known location), and which are communicating or interacting with the drone 104. The GPS satellites 106, the other drones 110, and/or the ground station 102 can be used as part of a primary location system to identify the current location of the drone 104.

Figure 2:
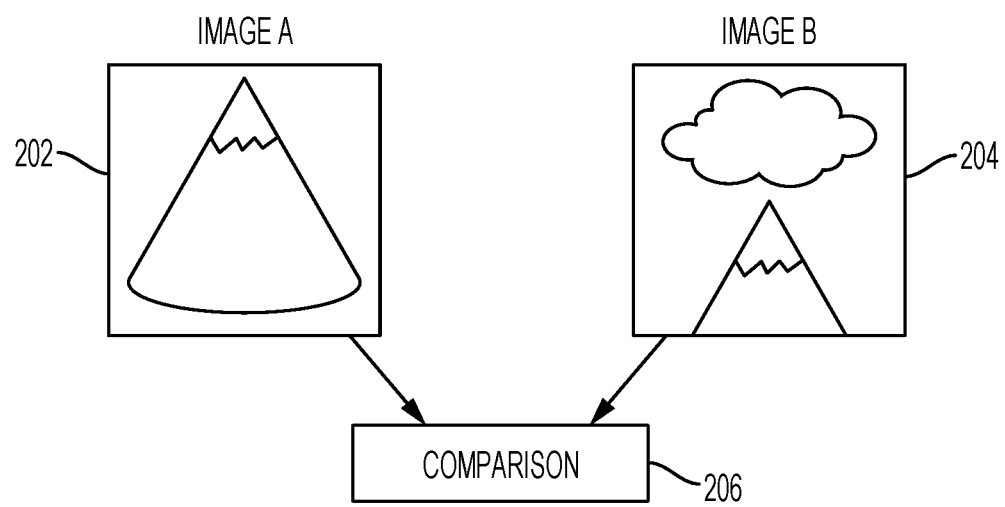
FIG. 2 illustrates an exemplary image comparison analysis.

FIG. 2 illustrates an exemplary image comparison analysis. When the primary location system used by an autonomous vehicle is disabled or otherwise impaired, the autonomous vehicle can initiate image capture of the vehicle's surroundings. This image capture can occur using photographic/image sensors on the exterior of the autonomous vehicle. An image 206 comparison can then occur, either aboard the autonomous vehicle or at a central control location communicating with the autonomous vehicle. The image comparison 206 compares a stored image 202 to a current image 204 of the autonomous vehicle's surroundings. Preferably, the stored image 202 has metadata associated with it containing information such as: GPS coordinates of the location from which the image was captured (i.e., where was the camera, or other capturing device, located when the picture was taken), the angle (from parallel to the ground) used by the capturing device to capture the image, the cardinal direction the capturing device was pointed at time of capture, time of day at time of capture, altitude and/or elevation of the capturing device at time of capture, etc.

When the images are compared 206, the comparison 206 can compare the actual pixels recorded for each image 202, 204, looking for similar patterns. In the illustrated example, the full mountain illustrated in the stored image 202 is not found in the current image 204. However, the top of the mountain is found, meaning either the current vehicle is higher than where the previous picture 202 was taken, or that the angle of the current photograph 204 is different than the angle used to capture the previous picture 202. The system performing the comparison can evaluate and compare the respective altitudes and angles used to capture the original image 202 and the current image 204. Based on that information, the system can determine the location of the autonomous vehicle, meaning the system can identify the Cartesian coordinates (latitude, longitude) of the autonomous vehicle, as well as the altitude of the vehicle. The image processing/comparison can use deep learning/neural networks (such as a convolutional neural network) to do the actual comparison and identification.

In some cases, the images compared may not be lateral imagery of the vehicle's surroundings, but instead are images directly below the vehicle. For instance, in UAVs (Unmanned Aerial Vehicles), the camera or image sensor may take a photograph down towards the earth, then compare that photograph to previously taken photographs using the principles described above. Similarly, a robot in a warehouse may take a photograph of the floor and/or of the ceiling, then use that photograph to identify its current location within the warehouse.

Figure 3:
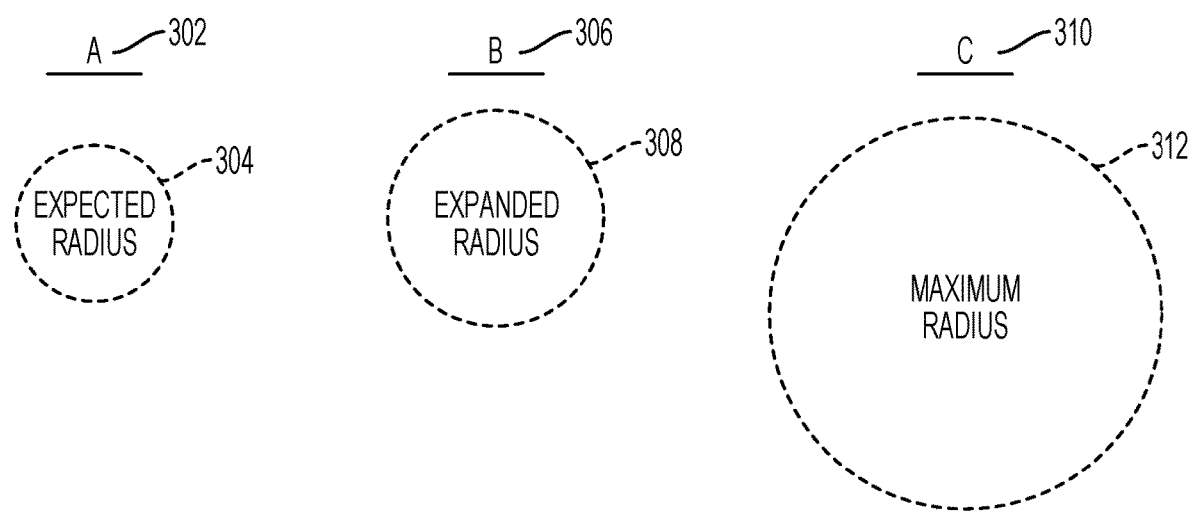
FIG. 3 illustrates an iteratively expanding radius for image comparison.

FIG. 3 illustrates an iteratively expanding radius for image comparison. First consider that the autonomous vehicle's primary location system is disabled, and if the autonomous vehicle cannot determine its location the current mission of the vehicle will need to be paused. In this condition, the autonomous vehicle takes a photograph of the vehicle's surroundings, and the secondary location system (configured as disclosed herein) compares the photograph to stored images. The goal is to identify a match between the stored images and the photograph, such that the secondary location system can determine, based on the comparison, the location of the autonomous vehicle.

However, rather than comparing the photograph to the entirety of all images stored in the database, the system first selects (at time A 302) images taken from locations near to where the autonomous vehicle is predicted to be located. In one configuration, these nearby photographs are within an expected geographic area 304, or radius, of the predicted location of the vehicle. In another configuration, the expected geographic area 304 from which the images are selected can vary based on the type of autonomous vehicle, the geography of the landscape the vehicle is travelling (i.e., if there's a mountain, it may be unlikely to begin with images captured from the far side of the mountain), the planned route or itinerary the autonomous vehicle is following, current weather conditions, etc.

If no matches are found, at time B 306 the system expands the geographic area 308 from which previously stored images are being selected for comparison to the photograph. The images from the expanded geographic area 308 are compared to the photograph, looking for a match. If no match is found the area continues to iteratively and incrementally expand until, at time C 310, the area being searched for an image match is the maximum area 312, or the entirety of the image database. If no match is found, the system can initiate a shutdown procedure of the autonomous vehicle, or communicate with a central controller for additional instructions.

While the example of the photograph has been given, in other configurations, other types of image capture data can be used. For example, if the autonomous vehicle is instead using a video capture system of the surroundings, and the video is compressed into frame types or picture types (such as I-frames, P-frames, and B-frames), data contained within these respective frames can be compared to data contained in the database, even if the respective format of the data contained in the database is not a similarly compressed video. Thus a video, or data contained in portions/frames of the video, capturing the vehicle's current surroundings can be compared to a flight simulator model, images, or other information stored in a database.

Figure 4:
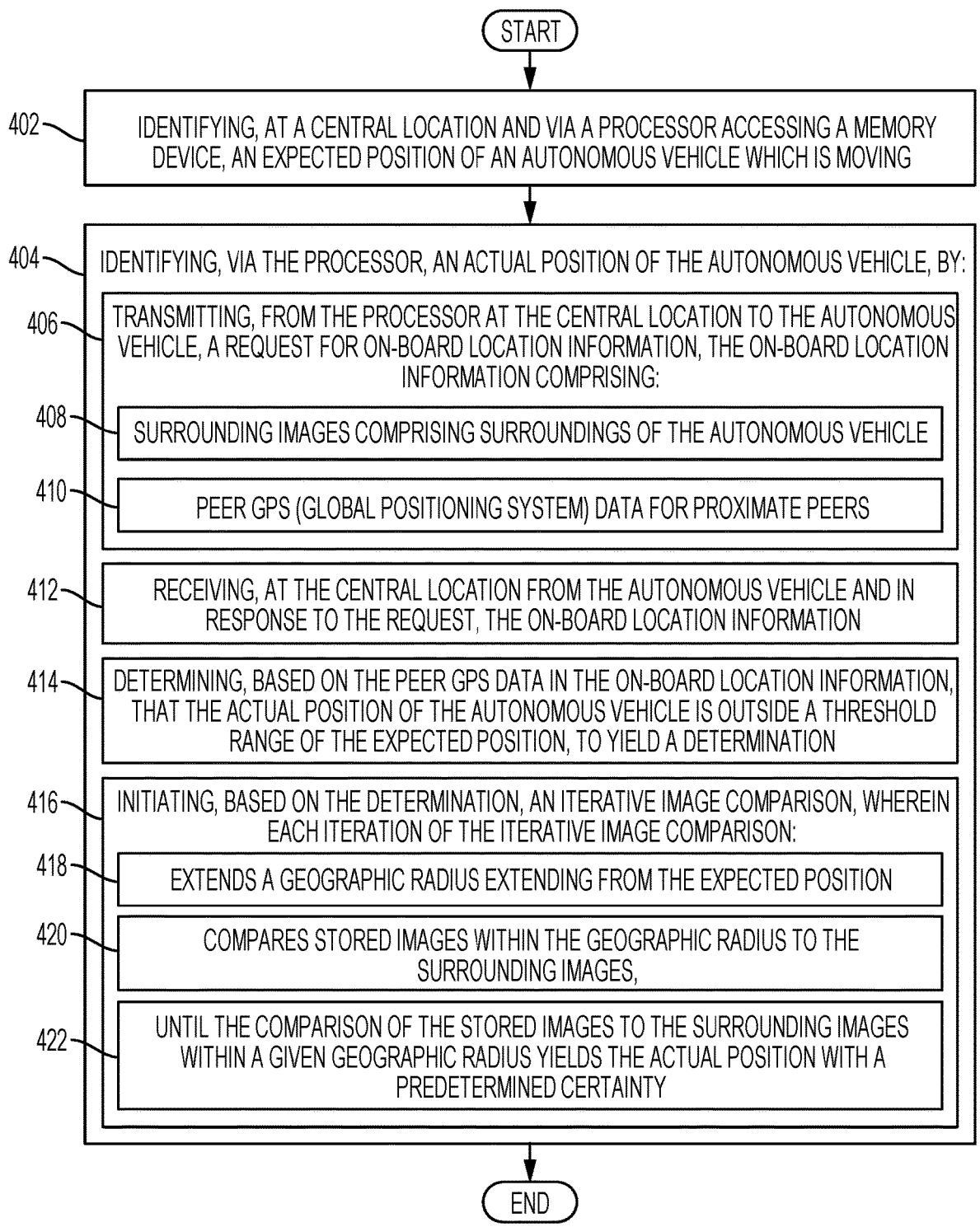
FIG. 4 illustrates an example method embodiment.

FIG. 4 illustrates an example method embodiment. The steps outlined herein are exemplary and can be implemented in any combination thereof, including combinations that exclude, add, or modify certain steps. The system identifies, at a central location and via a processor accessing a memory device, an expected position of an autonomous vehicle which is moving (402). The system then identifies, via the processor, an actual position of the autonomous vehicle, by (404): transmitting, from the processor at the central location to the autonomous vehicle, a request for on-board location information, the on-board location information comprising (406): surrounding images comprising surroundings of the autonomous vehicle (408); and peer GPS (Global Positioning System) data for proximate peers (410).

The system can then receive, at the central location from the autonomous vehicle and in response to the request, the on-board location information (412) and determines, based on the peer GPS data in the on-board location information, that the actual position of the autonomous vehicle is outside a threshold range of the expected position, to yield a determination (414). The system can then initiate, based on the determination, an iterative image comparison, wherein each iteration of the iterative image comparison (416): extends a geographic radius extending from the expected position (418); and compares stored images within the geographic radius to the surrounding images (420) until the comparison of the stored images to the surrounding images within a given geographic radius yields the actual position with a predetermined certainty (422).

Exemplary autonomous vehicles include unmanned vehicles such as drones, UAVs, driverless cars or trucks, delivery robots, warehouse robots, or other vehicles which do not require a human driver.

In some configurations, the surrounding images can include a panoramic image with a 360° view around the autonomous vehicle. The surrounding images can also include images of the ground beneath, or the ceiling above, the autonomous vehicle.

In some configurations, the proximate peers can include a plurality of other autonomous vehicles, and the peer GPS data can include GPS coordinates of the other autonomous vehicles.

In some configurations, the identifying of the actual position of the autonomous vehicle occurs in real-time, with the surrounding images are taken by the autonomous vehicle immediately upon receiving the request, and the initiation of the iterative image comparison begins immediately upon receiving the on-board location information.

Each iteration of the iterative image comparison can include: filtering landmarks from the stored images which are located outside the geographic radius for a given iteration, to yield filtered images, where the comparing of the stored images to the surrounding images uses the filtered images. Furthermore, such comparison can result in a more computationally efficient comparison than comparing the stored images to an entirety of the surrounding images stored in the database.

In some configurations, the on-board location information can further include distance data corresponding to the surrounding images, the distance data identifying a distance between the autonomous vehicle and an object pictured within the surrounding images. Such distance data can be obtained, for example, by a laser distance measurer, radar, sonar, or other distance measuring device.

Figure 5:
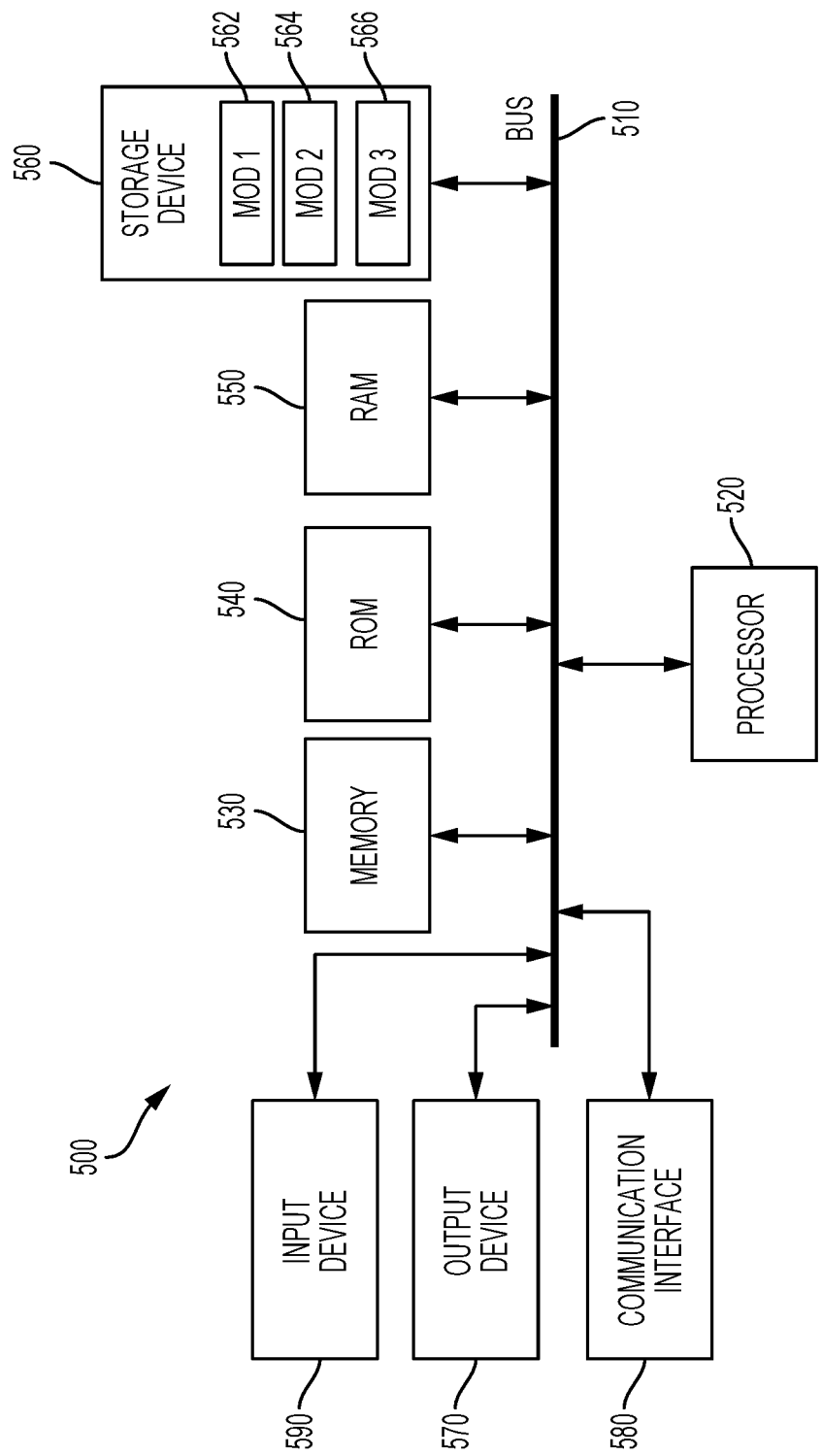
FIG. 5 illustrates an exemplary computer system.

With reference to FIG. 5, an exemplary system 500 includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    identifying, at a central location and via a processor accessing a memory device, an expected position of an autonomous vehicle which is moving; and
    identifying, via the processor, an actual position of the autonomous vehicle, by:
        transmitting, from the processor at the central location to the autonomous vehicle, a request for on-board location information, the on-board location information comprising:
            surrounding images comprising surroundings of the autonomous vehicle; and
            peer GPS (Global Positioning System) data for proximate peers;
        receiving, at the central location from the autonomous vehicle and in response to the request, the surrounding images;
    receiving, at the central location from the autonomous vehicle and in response to the request, the peer GPS data;
    determining, based on the peer GPS data in the on-board location information, that the actual position of the autonomous vehicle is outside a threshold range of the expected position, to yield a determination;
    initiating, based on the determination, an iterative image comparison, wherein each iteration of the iterative image comparison:
        extends a geographic radius extending from the expected position; and
        compares stored images within the geographic radius to the surrounding images,
        until the comparison of the stored images to the surrounding images within a given geographic radius yields the actual position with a predetermined certainty.

2. The method of claim 1, wherein the surrounding images comprise a panoramic image with a 360° view around the autonomous vehicle.

3. The method of claim 1, wherein the autonomous vehicle is an aerial drone, and the surrounding images comprise an image of ground beneath the aerial drone.

4. The method of claim 1, wherein the proximate peers comprise a plurality of other autonomous vehicles, and the peer GPS data comprise GPS coordinates of the other autonomous vehicles.

5. The method of claim 1, wherein the identifying of the actual position of the autonomous vehicle occurs in real-time, with the surrounding images are taken by the autonomous vehicle immediately upon receiving the request, and the initiation of the iterative image comparison begins immediately upon receiving the on-board location information.

6. The method of claim 1, wherein each iteration of the iterative image comparison further comprises:

filtering landmarks from the stored images which are located outside the geographic radius for a given iteration, to yield filtered images; and
wherein the comparing of the stored images to the surrounding images uses the filtered images.

7. The method of claim 6, wherein comparing the stored images to the surrounding images using the filtered images is more computationally efficient than comparing the stored images to an entirety of the surrounding images.

8. The method of claim 1, wherein the on-board location information further comprises distance data corresponding to the surrounding images, the distance data identifying a distance between the autonomous vehicle and an object pictured within the surrounding images.

9. A system comprising:
a processor; and
a computer-readable storage medium having instructions stored which, when executed by the processor, cause the processor to perform operations comprising:
identifying, at a central location, an expected position of an autonomous vehicle which is moving; and
identifying an actual position of the autonomous vehicle, by:
transmitting, from the central location to the autonomous vehicle, a request for on-board location information, the on-board location information comprising:
surrounding images comprising surroundings of the autonomous vehicle; and
peer GPS (Global Positioning System) data for proximate peers;
receiving, at the central location from the autonomous vehicle and in response to the request, the surrounding images;
receiving, at the central location from the autonomous vehicle and in response to the request, the peer GPS data;
determining, based on the peer GPS data in the on-board location information, that the actual position of the autonomous vehicle is outside a threshold range of the expected position, to yield a determination;
initiating, based on the determination, an iterative image comparison, wherein each iteration of the iterative image comparison:
extends a geographic radius extending from the expected position; and
compares stored images within the geographic radius to the surrounding images,
until the comparison of the stored images to the surrounding images within a given geographic radius yields the actual position with a predetermined certainty.

10. The system of claim 9, wherein the surrounding images comprise a panoramic image with a 360° view around the autonomous vehicle.

11. The system of claim 9, wherein the autonomous vehicle is an aerial drone, and the surrounding images comprise an image of ground beneath the aerial drone.

12. The system of claim 9, wherein the proximate peers comprise a plurality of other autonomous vehicles, and the peer GPS data comprise GPS coordinates of the other autonomous vehicles.

13. The system of claim 9, wherein the identifying of the actual position of the autonomous vehicle occurs in real-time, with the surrounding images are taken by the autonomous vehicle immediately upon receiving the request, and the initiation of the iterative image comparison begins immediately upon receiving the on-board location information.

14. The system of claim 9, wherein each iteration of the iterative image comparison further comprises:
filtering landmarks from the stored images which are located outside the geographic radius for a given iteration, to yield filtered images; and
wherein the comparing of the stored images to the surrounding images uses the filtered images.

15. The system of claim 14, wherein comparing the stored images to the surrounding images using the filtered images is more computationally efficient than comparing the stored images to an entirety of the surrounding images.

16. The system of claim 9, wherein the on-board location information further comprises distance data corresponding to the surrounding images, the distance data identifying a distance between the autonomous vehicle and an object pictured within the surrounding images.

17. A non-transitory computer-readable storage medium having instructions stored which, when executed by a computing device, cause the computing device to perform operations comprising:
identifying, at a central location, an expected position of an autonomous vehicle which is moving; and
identifying an actual position of the autonomous vehicle, by:
transmitting, at the central location to the autonomous vehicle, a request for on-board location information, the on-board location information comprising:
surrounding images comprising surroundings of the autonomous vehicle; and
peer GPS (Global Positioning System) data for proximate peers;
receiving, at the central location from the autonomous vehicle and in response to the request, the surrounding images;
receiving, at the central location from the autonomous vehicle and in response to the request, the peer GPS data;
determining, based on the peer GPS data in the on-board location information, that the actual position of the autonomous vehicle is outside a threshold range of the expected position, to yield a determination;
initiating, based on the determination, an iterative image comparison, wherein each iteration of the iterative image comparison:
extends a geographic radius extending from the expected position; and
compares stored images within the geographic radius to the surrounding images,
until the comparison of the stored images to the surrounding images within a given geographic radius yields the actual position with a predetermined certainty.

18. The non-transitory computer-readable storage medium of claim 17, wherein the surrounding images comprise a panoramic image with a 360° view around the autonomous vehicle.

19. The non-transitory computer-readable storage medium of claim 17, wherein the autonomous vehicle is an aerial drone, and the surrounding images comprise an image of ground beneath the aerial drone.

20. The non-transitory computer-readable storage medium of claim 17, wherein the proximate peers comprise a plurality of other autonomous vehicles, and the peer GPS data comprise GPS coordinates of the other autonomous vehicles.

\* \* \* \* \*